(12) United States Patent
Akavaram et al.

(10) Patent No.: US 12,393,479 B1
(45) Date of Patent: Aug. 19, 2025

(54) EXCEPTION EVENT HANDLING IN FLASH MEMORY SYSTEM

(71) Applicant: QUALCOMM Incorporated, San Diego, CA (US)

(72) Inventors: Santhosh Reddy Akavaram, Hyderabad (IN); Sai Naresh Gajapaka, Hyderabad (IN); Radhakrishna Mugada, Hyderabad (IN); Chintalapati Bharath Sai Varma, Hyderabad (IN); Sridhar Anumala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/670,511

(22) Filed: May 21, 2024

(51) Int. Cl.
*G06F 11/07* (2006.01)

(52) U.S. Cl.
CPC ........ *G06F 11/0772* (2013.01); *G06F 11/073* (2013.01)

(58) Field of Classification Search
CPC . G06F 11/0772; G06F 11/073; G06F 11/3037

USPC .......................................................... 714/49
See application file for complete search history.

(56) References Cited

U.S. PATENT DOCUMENTS

| 11,838,196 | B2* | 12/2023 | Hong | ................. | H04L 67/1097 |
| 12,137,164 | B1* | 11/2024 | Kim | ..................... | H03M 13/152 |
| 2024/0248780 | A1* | 7/2024 | Jo | ........................... | G06F 3/061 |

* cited by examiner

*Primary Examiner* — Chae M Ko
(74) *Attorney, Agent, or Firm* — NORTON ROSE FULBRIGHT US LLP

(57) ABSTRACT

This disclosure provides systems, methods, and devices for memory systems that support exception event handling and reporting. In a first aspect, a method of exception event handling in a flash memory system includes a host memory controller receiving a response from the memory system, the response comprising user data, an indication that an exception event was encountered by the memory system, and information regarding the exception event encountered by the memory system; and transmitting an acknowledgement of receiving the indication that the exception event was encountered by the memory system. Other aspects and features are also claimed and described.

20 Claims, 7 Drawing Sheets

416

| Query Response UPIU |||||
|---|---|---|---|---|
| 0 xx110110b | 1 Flags | 2 Reserved | 3 Task Tag ||
| 4 Reserved | 5 Query Function | 6 Query Response | 7 Reserved ||
| 8 EHS Length | 9 Device Info | 10 Data Segment Length | ||
| 12 | 13 | 14 | 15 ||
| Transaction Specific Fields |||||
| 16 | 17 | 18 | 19 ||
| Transaction Specific Fields |||||
| 20 | 21 | 22 | 23 ||
| Transaction Specific Fields |||||
| 24 | 25 | 26 | 27 ||
| Transaction Specific Fields |||||
| 28 | 29 | 30 | 31 ||
| wExceptionEventStatus || Additional_Field_Info ||
| Header E2ECRC (omit if HD=0) |||||
| k | k+1 | k+2 | k+3 ||
| | | | ||
| k+Length-4 | k+Length-3 | k+Length-2 | k+Length-1 ||
| Data E2ECRC (omit if DD=0) |||||

FIG. 4B

EXCEPTION EVENT HANDLING IN FLASH MEMORY SYSTEM

TECHNICAL FIELD

Aspects of the present disclosure relate generally to an apparatus and method for controlling a memory device. Some aspects may, more particularly, relate to an apparatus and method for controlling operations for exception event handling.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

One standard for organization and operation of electronic memory devices is the Universal Flash Storage (UFS) standard. The UFS standard was introduced as a successor to the eMMC (embedded MultiMediaCard) standard to offer higher performance and lower power consumption for mobile and other embedded devices. UFS provides support for a range of features such as multi-lane configurations, command queuing, and power-saving modes that enable high-speed data transfer rates, low latency, and long battery life. The UFS standard specifies many parameters for structuring, reading data from, and writing data to UFS-compliant memory devices. For example, UFS-compliant devices may include digital cameras, mobile phones, consumer electronic devices, and other devices with internal memory capacity. UFS-compliant memory may include memory embedded within electronic devices and removable memory cards, and UFS memory devices may implement NAND flash memory.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Errors may occur on a memory system during the execution of an operation by the memory system. The errors may be communicated to the host controller by providing information specifying exception events corresponding to errors. "Errors" refer to not just failures but also unexpected outcomes, inabilities to complete an operation, or conditions occurring during the operation that are outside of predefined parameters. Exception event handling may be understood as the operation of providing information by the memory system to the host controller of a status of the memory system.

Conventionally, communicating exception events to the host controller involves additional signaling of information from the memory system to the host controller, which reduces efficiency by consuming time on the memory system interface and consuming power to perform the signaling. Aspects of this disclosure provide exception event handling procedures that include the exception event information in a response message already being transmitted by the memory system, which improves the efficiency of operations on the memory system interface. For example, in some embodiments, 28th and 29th bytes (of an otherwise reserved section) of a response packet may be encoded with exception event information and an indicator in the response packet set to indicate the presence of the exception event information.

According to some aspects, the host controller may store the received exception event information in any of the memory-mapped input/output (MMIO) register space in the host controller. According to some aspects, the host controller may send an acknowledgement to indicate, to the memory system, the successful reception of the current exception status, which allows the memory system to clear the exception event. Aspects of the proposed embodiments reduce the overhead of sending commands and responses from the host device to memory system for fetching the exception event information, which reduces bandwidth consumption, increases system performance, and reduces power consumption.

In one aspect of the disclosure, an apparatus includes a memory controller of a host device configured to couple the host device to a memory system through a first interface (such as a memory interface), the memory controller configured to perform operations including receiving, by the memory controller of the host device, a response from the memory system, the response comprising user data, an indication that an exception event was encountered by the memory system, and information regarding the exception event encountered by the memory system; and transmitting, by the memory controller of the host device to the memory system, an acknowledgement of receiving the indication that the exception event was encountered by the memory system. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, a memory device includes a memory controller coupled to a memory module through a first channel and configured to access data stored in the memory module through the first channel; and coupled to a host device through a first interface (such as a memory interface) and configured to communicate with the host device over the first interface. The memory controller of the memory device may be configured to perform operations including sending, to the memory controller of the host device, a response from the memory system, the response comprising user data, an indication that an exception event was encountered by the memory system, and information regarding the exception event encountered by the memory system; and receiving, by the memory system from the memory controller of the host device, an acknowledgement of receiving the indication that the exception event was encountered by the memory system. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4B is a response message including information for exception event handling according to some embodiments of the disclosure.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in exception event handling procedures by including the exception event information in a response message already being transmitted by the memory system, which improves the efficiency of operations on the memory system interface. For example, in some embodiments, 28th and 29th bytes (of an otherwise reserved section) of a response packet may be encoded with exception event information and an indicator in the response packet be flagged to indicate the presence of the exception event information.

Particular implementations of the subject matter described in this disclosure may be implemented to realize one or more of the following potential advantages or benefits. In some aspects, the present disclosure provides techniques for improved performance of a memory system, such as reduced overhead of sending commands and responses from the host device to memory system for fetching the exception event information, which reduces bandwidth consumption, increases system performance, and reduces power consumption.

Figure 1:
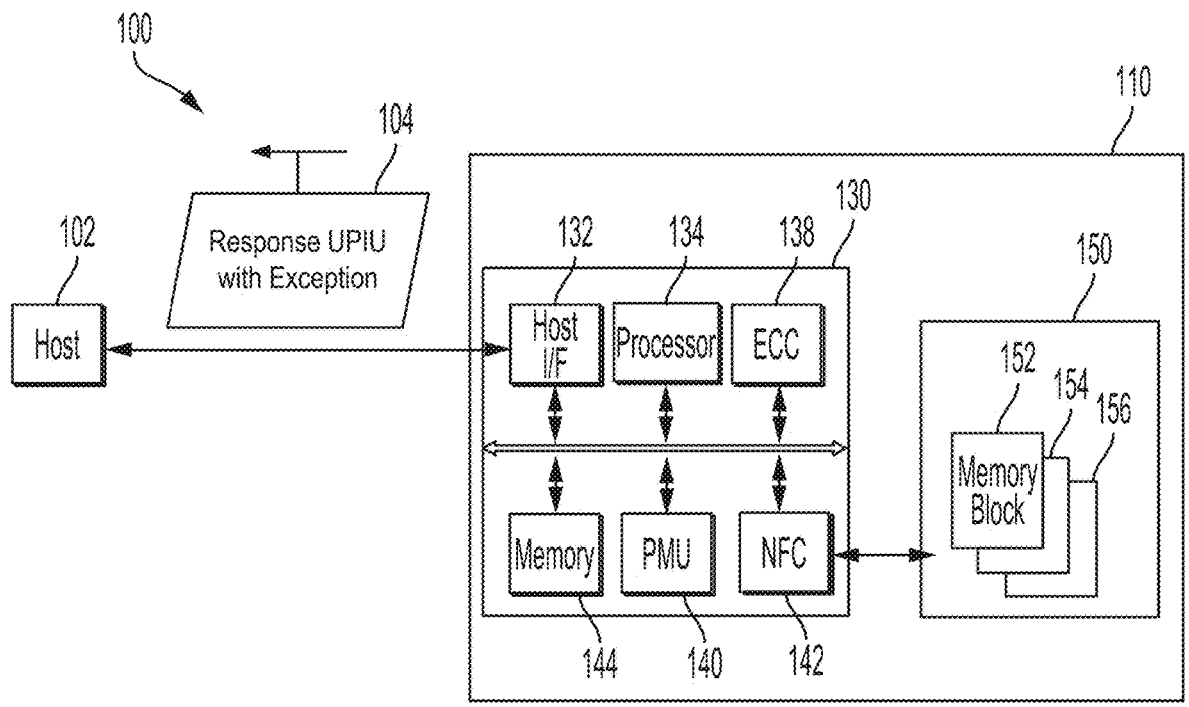
FIG. 1 is a block diagram illustrating a data processing system including a memory system in accordance with an embodiment of the present invention.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 6.

The memory system 110 may execute operations in response to commands (e.g., a request) from the host device 102. For example, the memory system 110 may store data provided by the host device 102 (a write operation) and the memory system 110 may also provide stored data to the host device 102 (a read operation). The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

An interface between the memory system 110 and the host device 102 provides a communication channel for conveying data related to the operations and/or related to a status or configuration of the memory system 110 and/or the host device 102. As one example communication, the memory system 110 may provide a Response UFS Protocol Information Unit (UPIU) packet 104 in response to the execution of a command from the host device 102 by the memory system 110. According to aspects of this disclosure, the Response UPIU packet 104 may include exception event information and/or indication.

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host interface unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

Figure 2:
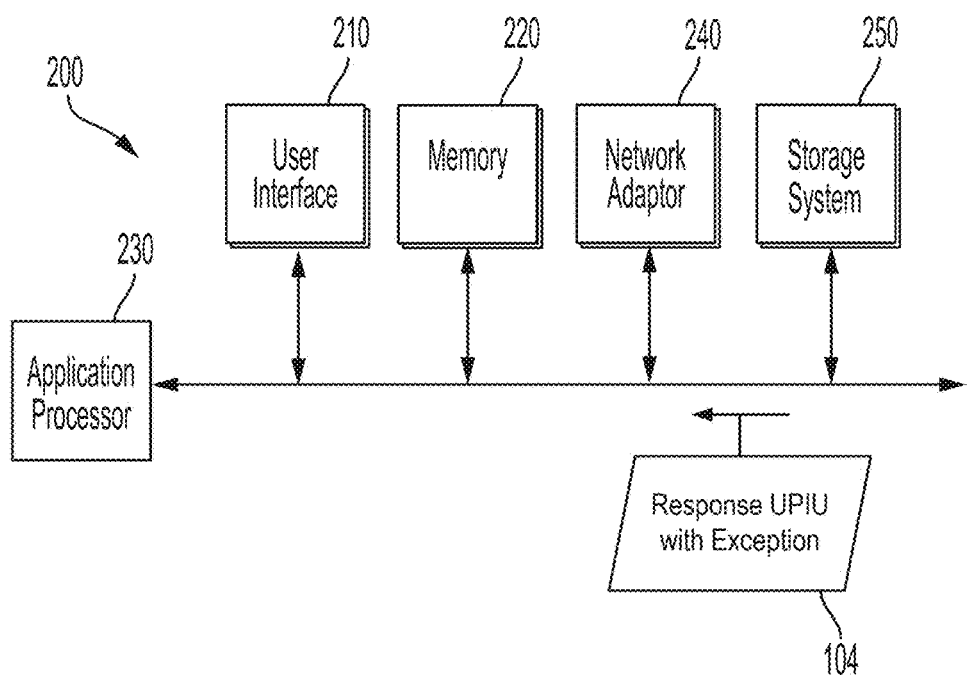
FIG. 2 is a block diagram illustrating an example electronic device including the memory system according to one or more aspects of the disclosure.

FIG. 2 is a block diagram illustrating an example electronic device including the memory system 100 according to one or more aspects of the disclosure. The electronic device 200 may include a user interface 210, a memory 220, an application processor 230, a network adaptor 240, and a storage system 250 (which may be one embodiment of the memory system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system. The storage system 250 may communicate with a host device, such as the application processor 230, by transmitting a Response UPIU packet 104 as further described in this disclosure, which, according to some aspects of this disclosure, may include exception event information and/or indication.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor.

Figure 3:
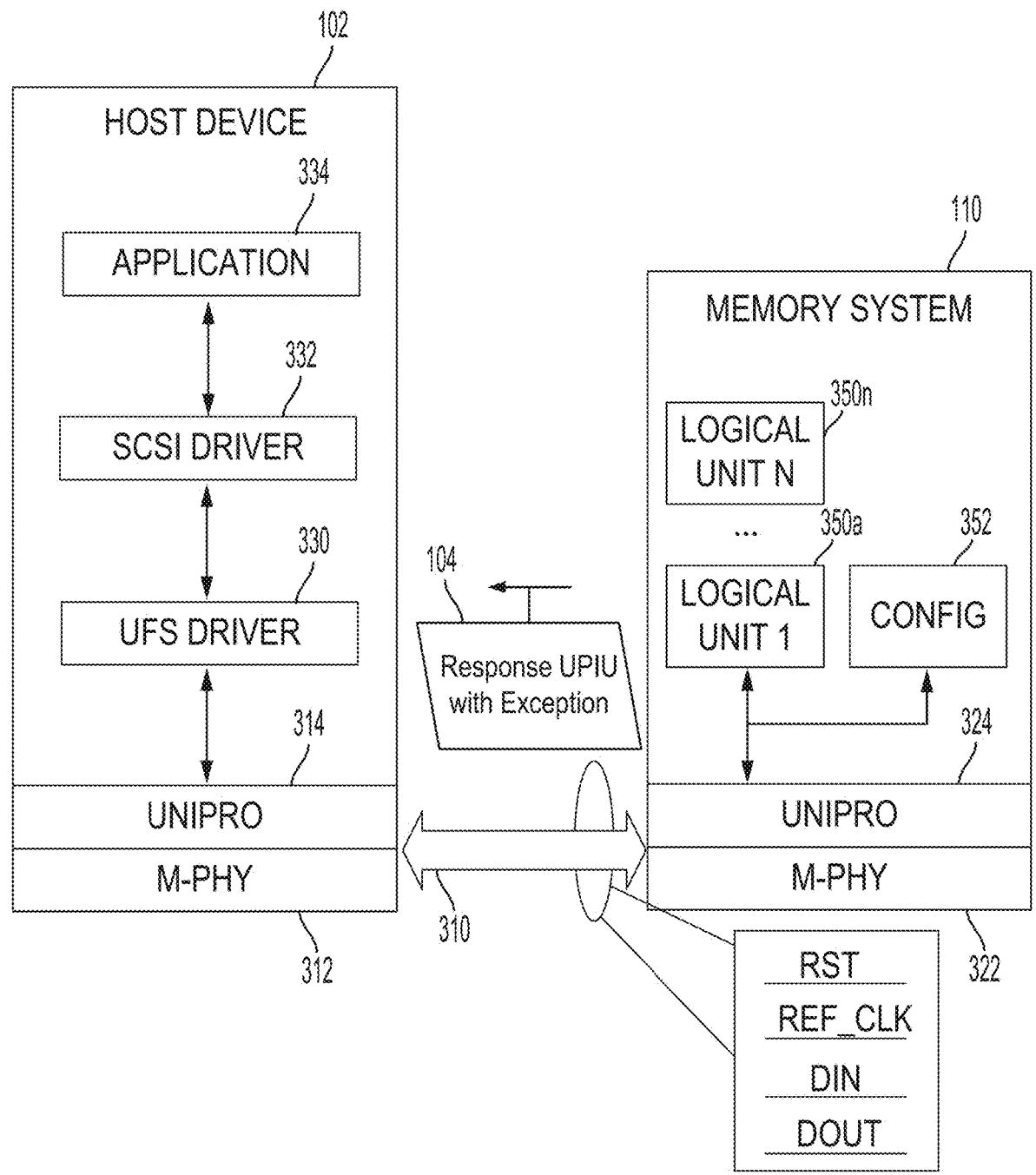
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through a first interface 310 (also referred to as a "memory interface"). The first interface may, for example, be a memory interface such as a physical interface (PHY) connecting the host device 102 to the memory system 110. The host device 102 may include physical layer access block 312, which is configured to generate signals for output to the memory interface 310 and process signals received through the memory interface 310. The memory system 110 includes a similarly-configured physical layer access block 322 for communicating on the memory interface 310. One example physical layer specification for communicating on the memory interface 310 is the MIPI M-PHY™ physical layer specification.

The host device 102 also includes a data link layer block 314 configured to format frames of data for transmission on the memory interface 310. The frames may be provided to the physical layer access block 312 for transmission. The data link layer block 314 may receive frames from the physical layer access block 312 and decode frames of data received on the memory interface 310. The memory system 110 includes a similarly-configured data link layer block 324 for processing frames transmitted on or received on the memory interface 310 by the physical layer access block 322. One example data link protocol for communicating on a MIPI M-PHY™ physical link is the MIPI UNIPRO™ specification.

The memory system 110 includes N logical units 350*a-n* comprising logical memory blocks for storing information including user data (e.g., user documents, application data) and configuration data (e.g., information regarding operation of the memory system 110). The logical units 350*a-n* may map to portions of the physical memory blocks 152, 154, and 156. Some of the logical units 350*a-n* or portions of the logical units 350*a-n* may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350*a-n*.

The memory system 110 also includes configuration structures 352. The configuration structures 352 may include information such as configuration descriptors for boot enable (bBootEnable), initial power mode (bInitPowerMode), RPMB active (bRPMBRegionEnable), and/or RPMB region sizes (bRPMBRegion1Size, bRPMBRegion2Size, bRPMBRegion3Size). Such configuration structures and/or parameters may, for example, be configuration structures and/or parameters identified by the UFS standard.

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the memory interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the memory interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The memory interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N. The memory system 110 may communicate with the host device 102, by transmitting a Response UPIU packet 104 as further described in this disclosure, which, according to some aspects of this disclosure, may include exception event information and/or indication.

The UFS driver 330 may generate and decode packets to carry out transactions requested by the application 334. The packets are transmitted over the memory interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations includes read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanenetWPEn, fPowerOn WPEn, fBackgroundOpsEn, fDeviceLifeSpanModeEn, fPurge Enable, fRefreshEnable, fPhyResourceRemoval, fBusyRTC, and/or fPermanentlyDisableFwUpdate. Example attributes include bBootLunEn, bCurrentPowerMode, bActiveICCLevel, bOutOfORderDataEn, bBackgroundOpStatus, bPurgeStatus, bMaxDataInSize, bMaxDataOutSize, dDynCapNeeded, bRefClkFreq. Such flags may, for example, be flags identified by the UFS standard.

Figure 4A:
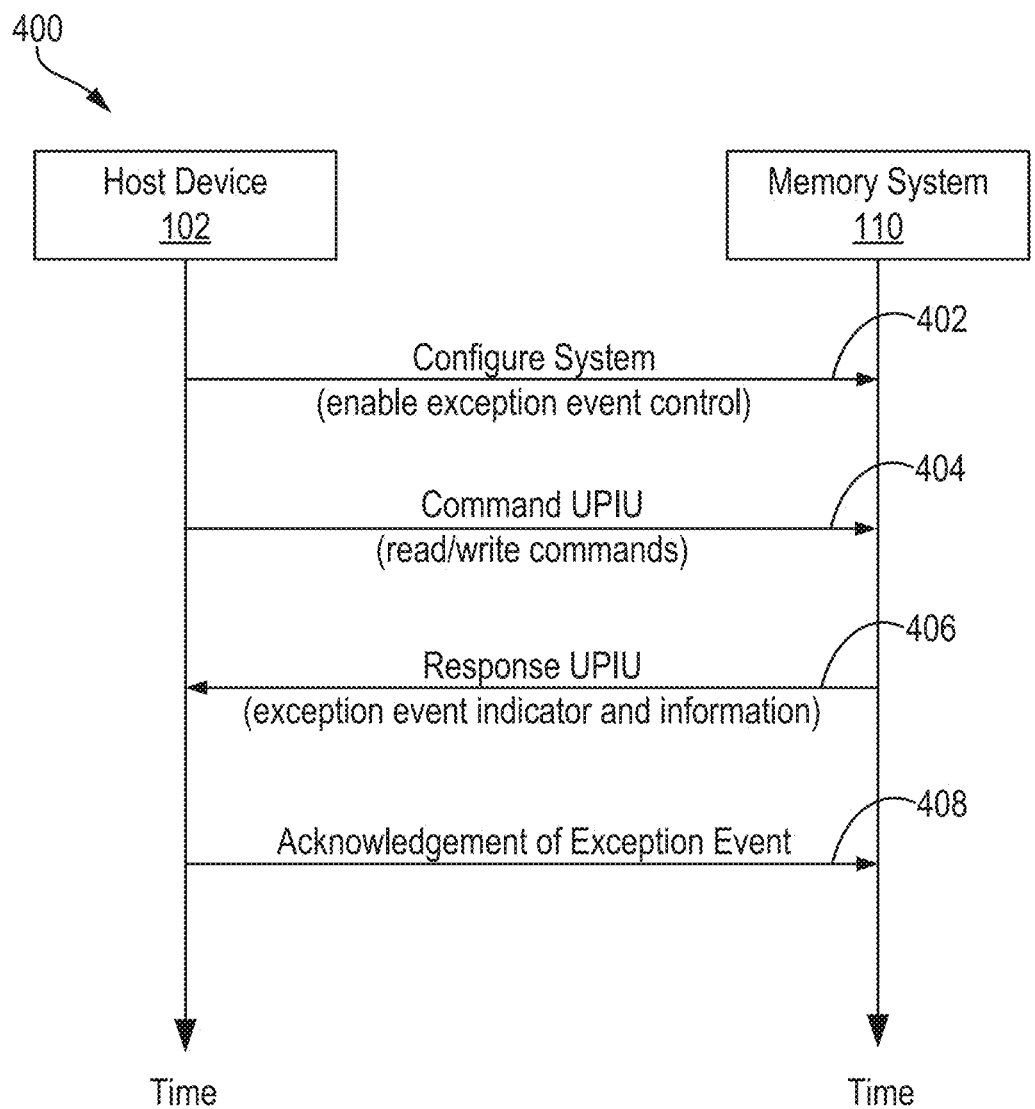
FIG. 4A is a call diagram illustrating exception event handling according to some embodiments of the disclosure.

The operations and capabilities described above may be used for a memory system that supports reporting exception indication and information in a response message that may include user data. For example, an exception indication and exception information may be included in a Response UPIU transmitted by the memory system to the host device, although the indication and information may alternatively be included in other UPIUs. The host device may decode the Response UPIU to determine a response to the read/write command and determine the exception indicator and exception information without further messaging to the memory system to obtain details of an exception event that occurred during the command execution. FIG. 4A is a call flow for improved exception event communication according to one or more aspects of the disclosure.

FIG. 4A illustrates a communication exchange 400 between the host device 102 and the memory system 110. The exchange 400 may include the transmission of one or more messages over a first interface coupling the host device 102 and the memory system 110. For example, the messages may include one or more Command UPIUs, Response UPIUs, and/or other UPIUs transmitted according to the UFS standard. As another example, the messages may be communicated by setting one or more registers within the memory system 110 or other memory-mapped input/output (MMIO) operations.

An exception event communication according to embodiments of the exchange 400 of FIG. 4A may begin at step 402 with configuring the memory system 110 by the host device 102. For example, step 402 may include, during a configuration phase, the host device 102 setting a wExceptionEventControl register to a particular value to enable exception event control. For example, the wExceptionEventControl register may be set to 0xFF to indicate exception event control is enabled for all possible exception events. The register may be configured to other settings, such as by determining a value in which each bit of the value represents enabling or disabling exception event control for a particular exception event. For example, setting bit 0 may enable exception event control for the DYNCAP_EVENT, setting bit 1 may enable exception event control for SYSPOOL_EVENT, and similarly for other bits. A list of additional exception events that may be configured by setting other bits is shown in Table 1 below.

During operation of the host device 102 with the memory system 110 configured according to step 402, the host device 102 may interact with the memory system 110 by instructing the memory system 110 to perform certain operations. For example, the host device 102 may execute applications that request user data from the memory system 110. User data may refer to user-created data (such as documents, spreadsheets, presentations, photographs, video files, and audio files) and also user-accessed data (such as application data, game save files, downloaded files, and operating system data). Operation of the configured memory system 110 may include interactions such as described in steps 404, 406, and 408.

At step 404, the host device 102 transmits a Command UPIU to the memory system 110, which may indicate a read and/or write operation to be performed by the memory system 110. The memory system 110 may execute the operation indicated by the Command UPIU. During the execution of the operation, the memory system 110 may encounter an exception event. An exception event may indicate an unexpected result encountered during the execution of the operation. Example exception events may include any of the exception events shown in Table 1. An indication of an exception event may be stored in the memory system, along with information regarding the exception event. The temporary storage of the exception event in the memory system 110 may be in the memory blocks of the memory system 110, in volatile memory of the memory system 110, and/or in registers in the memory system 110.

TABLE 1

Example exception events.

| | |
|---|---|
| DYNCAP_NEEDED | the device requests a Dynamic Capacity operation |
| SYSPOOL_EXHAUSTED | the device ran out of resources to treat further host data as System Data |
| URGENT_BKOPS | the device requests host attention for the level of need in Background Operations |
| TOO TOO_HIGH_TEMP | the device requests that the host takes action to reduce the device's Tcase |

TABLE 1-continued

Example exception events.

| | |
|---|---|
| TOO TOO_LOW_TEMP | temperature<br>the device requests that the host takes action to increase the device's Tcase temperature |
| PERFORMANCE_THROTTLING | the device is operating at reduced performance |
| WRITEBOOSTER_FLUSH_NEEDED | Buffer for WriteBooster needs to be flushed |

At step 406, the memory system 110 transmits a Response UPIU to the host device 102, which may include data in response to the command UPIU of step 404 packaged with the exception event indicator and information. For example, certain bits of the Response UPIU may be set to indicate an exception event was encountered and/or certain bits of the Response UPIU may be set to encode information regarding the exception event, such as information regarding the type of exception event encountered by the memory system 110. An example Response UPIU including the exception event indication and exception event information is shown in FIG. 4B. FIG. 4B is a table showing bits in a Response UPIU message including an exception event according to one or more aspects of the disclosure. The Response UPIU 416 includes a header of 32 bits that precedes user data of length k bits. The Response UPIU 416 may be packaged as a single packet and transmitted over the first interface to the host device 102. An exception event indicator may be stored in $28^{th}$ and $29^{th}$ bits in the header of the Response UPIU 416. Additional exception event information may be stored in the $30^{th}$ and $31^{st}$ bits in the header of the Response UPIU 416. UPIU [28:31] thus includes data relating to an exception event according to embodiments of a Response UPIU 416.

At step 408, the host device 102 provides an acknowledgement of the exception event indicated in step 406. In response to the acknowledgement, the memory system 110 may clear the exception event from its memory, which causes the memory system 110 to no longer include the exception even in Response UPIUs transmitted to the host device 102. The exception event indicator and information may continue to be transmitted in Response UPIUs until the acknowledgement is received by the memory system 110 to clear the exception events. When new exception events are encountered by the memory system, the memory system may repeat the step 406 in response to a command. The host device 102 may, prior to transmitting the acknowledgement, store the wExceptionEventStatus information in a memory-mapped input/output (MMIO) register of the host device 102. The acknowledgement may be transmitted, in some embodiments, encoded as a particular opcode designated as an ACK/NACK command in the UFS SCSI Command Set. For example, an opcode of 0x3C may be assigned to indicate an acknowledgement.

Figure 5:
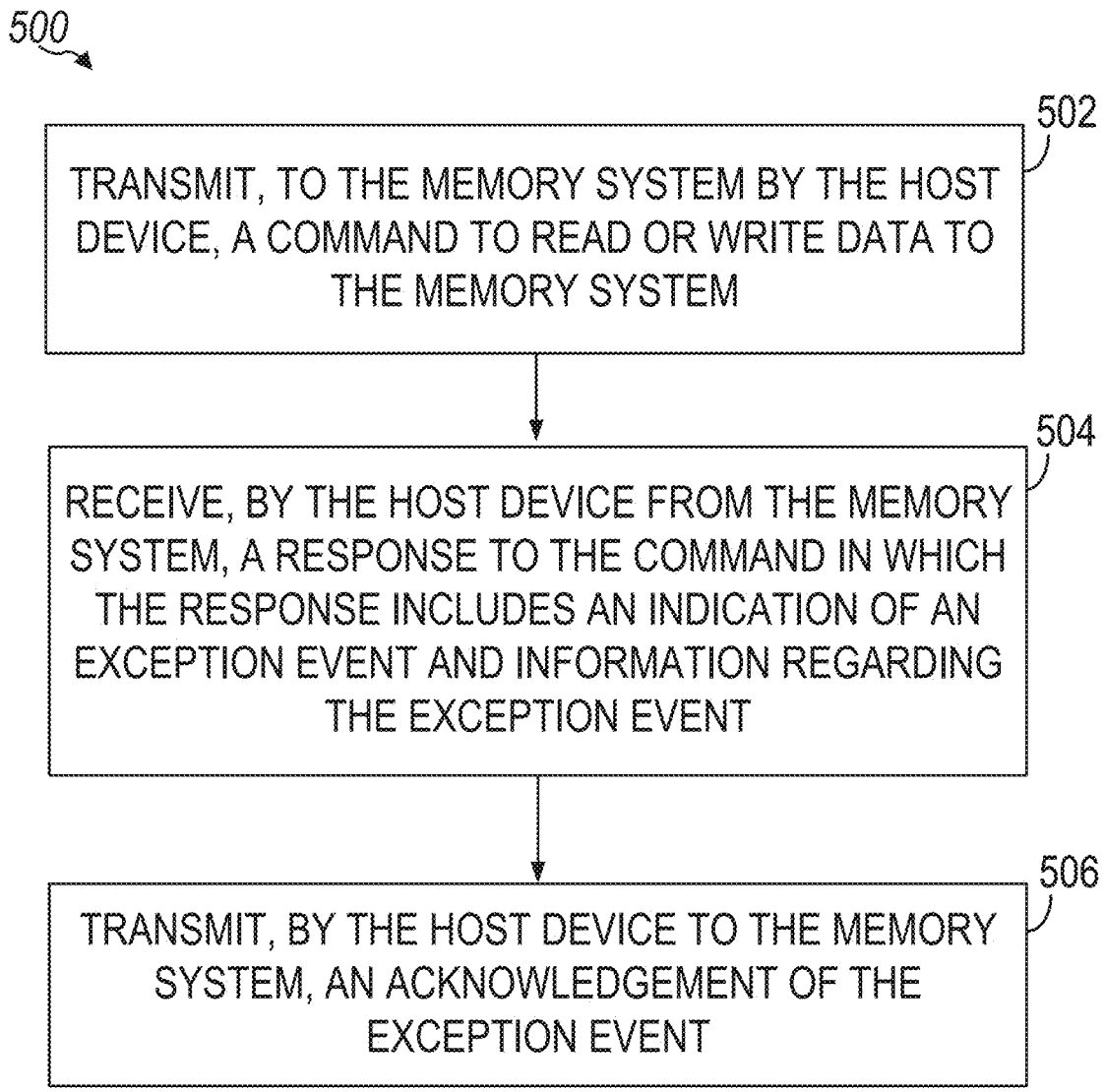
FIG. 5 is a flow chart illustrating a method for exception event handling by a host controller according to some embodiments of the disclosure.

FIG. 5 is a flow chart illustrating a method for exception event handling by a host controller according to some embodiments of the disclosure. A method 500 includes, at block 502, transmitting, to the memory system by the host controller of the host device, a command to read or write data to the memory system. The transmitted command may alternatively be commands to perform other operations, such as a command to provide status information and/or set a configuration register of the memory system.

At block 504, the method 500 includes the host memory controller receiving, by the host device from the memory system, a response to the command of block 502, in which the response includes an indication of an exception event and information regarding the exception event. As an example, when the command of block 502 is a read command to obtain user data at a specified memory address, the response of block 504 may be a response including accessible user data stored at the memory address. When the memory system encountered an exception during the execution of the command, the response may further include an exception event indicator and exception event information included with the response. For example, a specified bit of a wExceptionEventStatus field in a header of a Response UPIU, such as the Response UPIU of FIG. 4B, may be set to '1' to indicate an exception event. Additional bits of the wExceptionEventStatus field may be set to encode information regarding the exception event encountered by the memory system. The host controller may decode the Response UPIU to determine that an exception event occurred and determine information regarding the exception event, such as which of the exception events of Table 1 were encountered by the memory system. The host controller may store the wExceptionEventStatus field in a memory-mapped input/output (MMIO) register.

At block 506, the method 500 includes the memory controller transmitting, by the host device to the memory system, an acknowledgement of the exception event. The acknowledgement may be transmitted, in some embodiments, encoded as a particular opcode designated as an ACK/NACK command in the UFS SCSI Command Set. For example, an opcode of 0x3C may be assigned to indicate an acknowledgement.

Figure 6:
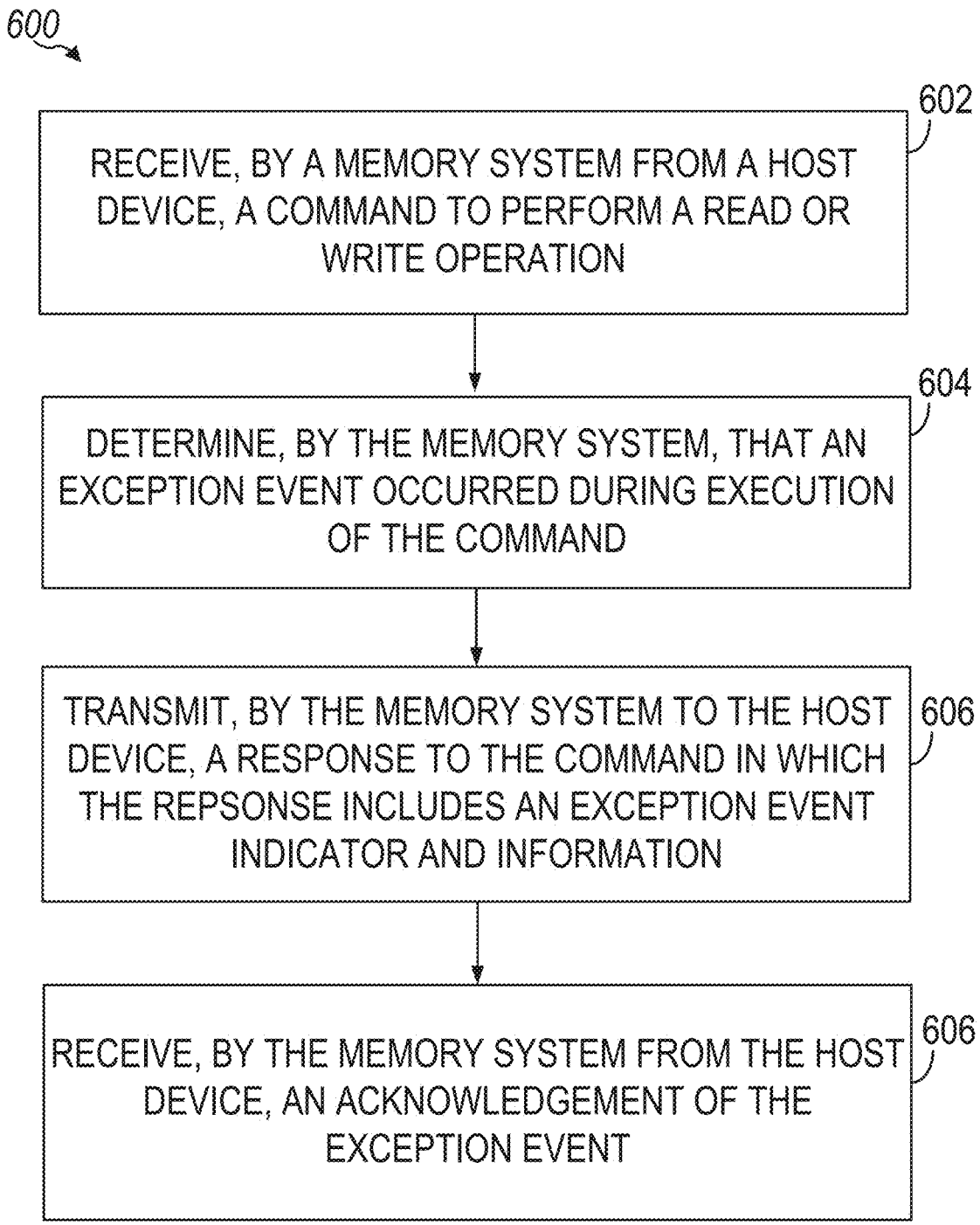
FIG. 6 is a flow chart illustrating a method for exception event handling by a flash memory device according to some embodiments of the disclosure.

The memory system may perform a corresponding method for interfacing with the host memory controller when the controller is executing a method of operation according to aspects of FIG. 5. FIG. 6 is a flow chart illustrating a method for exception event handling by a flash memory system according to some embodiments of the disclosure. A method 600 includes, at block 602, receiving, by a memory system from a host device, a command to perform a read or write operation. The transmitted command may alternatively be commands to perform other operations, such as a command to provide status information and/or set a configuration register of the memory system.

At block 604, the method 600 may include determining, by the memory system, that an exception event occurred during execution of the command of block 602. The exception may be, for example, one of the exceptions listed in Table 1. The exception may be stored in memory by the memory system, such as in an exception queue.

At block 606, the method 600 may include transmitting, by the memory system to the host device, a response to the command in which the response includes an exception event indicator and information. When the memory system encounters an exception during the execution of the command received at block 602, the response may further include an exception event indicator and exception event information included with the response. For example, a specified bit of a wExceptionEventStatus field in a header of a Response UPIU, such as the Response UPIU of FIG. 4B, may be set to '1' to indicate an exception event. Additional bits of the wExceptionEventStatus field may be set to encode information regarding the exception event encountered by the memory system.

At block 608, the method 600 may include receiving, by the memory system from the host device, an acknowledgement of the exception event transmitted in the response of block 606. The acknowledgement may be transmitted, in some embodiments, encoded as a particular opcode designated as an ACK/NACK command in the UFS SCSI Command Set. For example, an opcode of 0x3C may be assigned to indicate an acknowledgement. When the memory system receives the acknowledgement, the memory system may clear the exception event from its memory. In some embodiments, the memory system may continue to provide the exception event indicator and information in response messages until an acknowledgement is received.

Figure 7:
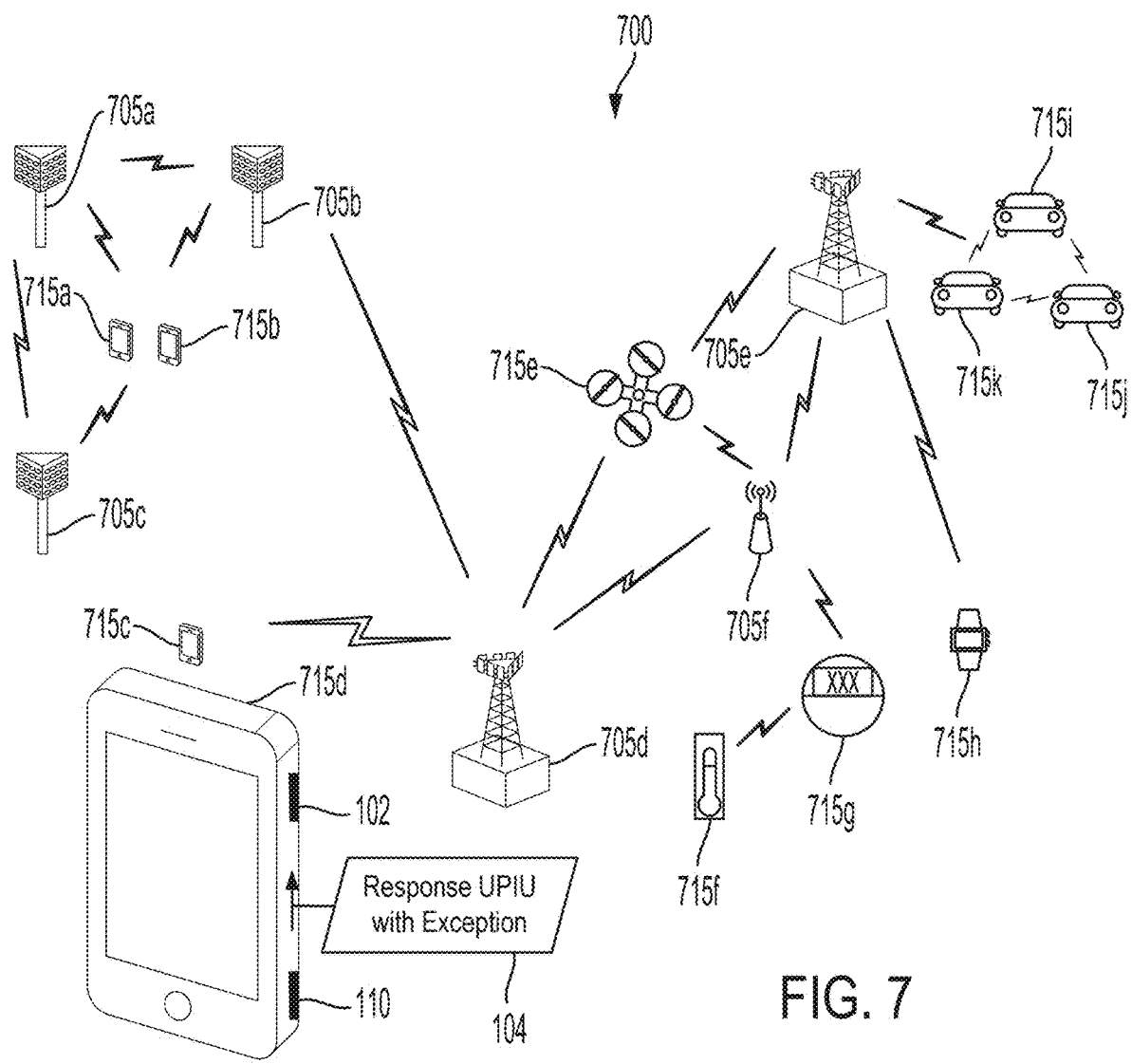
FIG. 7 is a block diagram illustrating details of an example wireless communication system according to one or more aspects.

Operations of method 500 or method 600 may be performed by a UE, such as a UE described with reference to FIG. 7. For example, example operations (also referred to as "blocks") of method 500 or method 600 may enable UE 715 to support greater user data confidentiality. FIG. 7 is a block diagram illustrating details of an example wireless communication system according to one or more aspects. The wireless communication system may include wireless network 700. Wireless network 700 may, for example, include a 5G wireless network. As appreciated by those skilled in the art, components appearing in FIG. 7 are likely to have related counterparts in other network arrangements including, for example, cellular-style network arrangements and non-cellular-style-network arrangements (e.g., device to device or peer to peer or ad hoc network arrangements, etc.).

Wireless network 700 illustrated in FIG. 7 includes a number of base stations 705 and other network entities. A base station may be a station that communicates with the UEs and may also be referred to as an evolved node B (eNB), a next generation eNB (gNB), an access point, and the like. Each base station 705 may provide communication coverage for a particular geographic area. In 3GPP, the term "cell" may refer to this particular geographic coverage area of a base station or a base station subsystem serving the coverage area, depending on the context in which the term is used. In implementations of wireless network 700 herein, base stations 705 may be associated with a same operator or different operators (e.g., wireless network 700 may include a plurality of operator wireless networks). Additionally, in implementations of wireless network 700 herein, base station 705 may provide wireless communications using one or more of the same frequencies (e.g., one or more frequency bands in licensed spectrum, unlicensed spectrum, or a combination thereof) as a neighboring cell. In some examples, an individual base station 705 or UE 715 may be operated by more than one network operating entity. In some other examples, each base station 705 and UE 715 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 7, base stations 705d and 705e are regular macro base stations, while base stations 705a-705c are macro base stations enabled with one of 3 dimension (3D), full dimension (FD), or massive MIMO. Base stations 705a-705c take advantage of their higher dimension MIMO capabilities to exploit 3D beamforming in both elevation and azimuth beamforming to increase coverage and capacity. Base station 705f is a small cell base station which may be a home node or portable access point. A base station may support one or multiple (e.g., two, three, four, and the like) cells.

Wireless network 700 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 715 are dispersed throughout the wireless network 700, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 715, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 715a-715d of the implementation illustrated in FIG. 7 are examples of mobile smart phone-type devices accessing wireless network 700. Each of the UEs may include a memory system and/or host controller described according to aspects of this disclosure. For example, the memory system 110 may communicate with a host controller 102 by transmitting a Response UPIU packet 104 as further described in this disclosure, which, according to some aspects of this disclosure, may include exception event information and/or indication. A UE may also be a machine specifically configured for connected communication, including machine type communication (MTC), enhanced MTC (eMTC), narrowband IoT (NB-IoT) and the like. UEs 715e-715k illustrated in FIG. 7 are examples of various machines configured for communication that access wireless network 700.

A mobile apparatus, such as UEs 715, may be able to communicate with any type of the base stations, whether macro base stations, pico base stations, femto base stations, relays, and the like. In FIG. 7, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 700 may occur using wired or wireless communication links.

In operation at wireless network 700, base stations 705a-705c serve UEs 715a and 715b using 3D beamforming and coordinated spatial techniques, such as coordinated multipoint (CoMP) or multi-connectivity. Macro base station 705d performs backhaul communications with base stations 705a-705c, as well as small cell, base station 705f. Macro base station 705d also transmits multicast services which are subscribed to and received by UEs 715c and 715d. Such multicast services may include mobile television or stream video, or may include other services for providing community information, such as weather emergencies or alerts, such as Amber alerts or gray alerts.

Wireless network 700 of implementations supports mission critical communications with ultra-reliable and redundant links for mission critical devices, such UE 715e, which is a aeronautical vehicle. Redundant communication links with UE 715e include from macro base stations 705d and 705e, as well as small cell base station 705f. Other machine type devices, such as UE 715f (thermometer), UE 715g (smart meter), and UE 715h (wearable device) may communicate through wireless network 700 either directly with base stations, such as small cell base station 705f, and macro base station 705e, or in multi-hop configurations by communicating with another user device which relays its information to the network, such as UE 715f communicating temperature measurement information to the smart meter, UE 715g, which is then reported to the network through small cell base station 705f. Wireless network 700 may also provide additional network efficiency through dynamic, low-latency TDD communications or low-latency FDD communications, such as in a vehicle-to-vehicle (V2V) mesh network between UEs 715i-715k communicating with macro base station 705e.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, an electronic device, such as a UE, may be an apparatus as a host device that includes a memory controller configured to couple to an interface to a memory system, in which the memory system may be integrated with the host device or externally coupled to the host device. The memory system may include a memory controller coupled to a memory system through a first channel and configured to access data stored in the memory system through the first channel and coupled to a host device through a first interface and configured to communicate with the host device over the first interface. The operations may be executed as part of an initialization operation, a read operation or a write operation.

In a first aspect, the memory controller of the host device may be configured to perform operations including receiving, by the memory controller of the host device, a response from the memory system, the response comprising user data, an indication that an exception event was encountered by the memory system, and information regarding the exception event encountered by the memory system; and transmitting, by the memory controller of the host device to the memory system, an acknowledgement of receiving the indication that the exception event was encountered by the memory system.

In a second aspect, in combination with the first aspect, the response comprises a single packet comprising the user data, the indication that an exception event was encountered by the memory system, and the information regarding the exception event encountered by the memory system.

In a third aspect, in combination with one or more of the first aspect or the second aspect, the information regarding the exception event encountered by the memory system is encoded in a header of the single packet.

In a fourth aspect, in combination with one or more of the first aspect through the third aspect, the information regarding the exception event encountered by the memory system is encoded in 28th and 29th bytes of the header of the single packet.

In a fifth aspect, in combination with one or more of the first aspect through the fourth aspect, transmitting the acknowledgement comprises transmitting a command indicating the acknowledgement.

In a sixth aspect, in combination with one or more of the first aspect through the fifth aspect, the command indicating the acknowledgement comprises an opcode of 0x3C.

In a seventh aspect, in combination with one or more of the first aspect through the sixth aspect, the memory controller couples the host device to the memory system comprising a flash memory device configured as a universal flash storage (UFS) device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 4A-E, 5, or 6 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIG. 4A-E, 5, or 6. Additionally, or alternatively, one or more operations described above with reference to FIGS. 1-3 may be combined with one or more operations described with reference to FIGS. 4-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   a memory controller of a host device configured to couple the host device to a memory system through a memory interface, the memory controller configured to perform operations including:
   receiving, by the memory controller of the host device, a response from the memory system, the response comprising user data, an indication that an exception event was encountered by the memory system, and information regarding the exception event encountered by the memory system; and
   transmitting, by the memory controller of the host device to the memory system, an acknowledgement of receiving the indication that the exception event was encountered by the memory system.

2. The apparatus of claim 1, wherein the response comprises a single packet comprising the user data, the indication that the exception event was encountered by the memory system, and the information regarding the exception event encountered by the memory system.

3. The apparatus of claim 2, wherein the information regarding the exception event encountered by the memory system is encoded in a header of the single packet.

4. The apparatus of claim 3, wherein the information regarding the exception event encountered by the memory system is encoded in $28^{th}$ and $29^{th}$ bytes of the header of the single packet.

5. The apparatus of claim 1, wherein transmitting the acknowledgement comprises transmitting a command indicating the acknowledgement.

6. The apparatus of claim 5, wherein the command indicating the acknowledgement comprises an opcode of 0x3C.

7. The apparatus of claim 1, wherein the memory controller couples the host device to the memory system comprising a flash memory device configured as a universal flash storage (UFS) device.

8. A method, comprising:
receiving, by a memory controller of a host device, a response from a memory system, the response comprising user data, an indication that an exception event was encountered by the memory system, and information regarding the exception event encountered by the memory system; and
transmitting, by the memory controller of the host device to the memory system, an acknowledgement of receiving the indication that the exception event was encountered by the memory system.

9. The method of claim 8, wherein the response comprises a single packet comprising the user data, the indication that the exception event was encountered by the memory system, and the information regarding the exception event encountered by the memory system.

10. The method of claim 9, wherein the information regarding the exception event encountered by the memory system is encoded in a header of the single packet.

11. The method of claim 10, wherein the information regarding the exception event encountered by the memory system is encoded in $28^{th}$ and $29^{th}$ bytes of the header of the single packet.

12. The method of claim 8, wherein transmitting the acknowledgement comprises transmitting a command indicating the acknowledgement.

13. The method of claim 12, wherein the command indicating the acknowledgement comprises an opcode of 0x3C.

14. An apparatus, comprising:
an application processor;
a host memory controller coupled to the application processor and coupled to a memory system through a memory interface and configured to access data stored in the memory system through the memory interface, the host memory controller configured to perform operations comprising:
receiving, by the host memory controller, a response from the memory system, the response comprising user data, an indication that an exception event was encountered by the memory system, and information regarding the exception event encountered by the memory system; and
transmitting, by the host memory controller to the memory system, an acknowledgement of receiving the indication that the exception event was encountered by the memory system.

15. The apparatus of claim 14, wherein the response comprises a single packet comprising the user data, the indication that the exception event was encountered by the memory system, and the information regarding the exception event encountered by the memory system.

16. The apparatus of claim 15, wherein the information regarding the exception event encountered by the memory system is encoded in a header of the single packet.

17. The apparatus of claim 16, wherein the information regarding the exception event encountered by the memory system is encoded in $28^{th}$ and $29^{th}$ bytes of the header of the single packet.

18. The apparatus of claim 14, wherein transmitting the acknowledgement comprises transmitting a command indicating the acknowledgement.

19. The apparatus of claim 18, wherein the command indicating the acknowledgement comprises an opcode of 0x3C.

20. The apparatus of claim 14, wherein the host memory controller couples the application processor to the memory system, the memory system comprising a flash memory device configured as a universal flash storage (UFS) device.

* * * * *